United States Patent [19]

Halling

[11] 4,218,067
[45] Aug. 19, 1980

[54] MULTI-PLY SEALING RINGS

[75] Inventor: Horace P. Halling, Laurel, Md.

[73] Assignee: Pressure Science Incorporated, Beltsville, Md.

[21] Appl. No.: 8,856

[22] Filed: Feb. 2, 1979

[51] Int. Cl.² ............................................. F16J 15/02
[52] U.S. Cl. .................................. 277/205; 277/198; 277/236
[58] Field of Search ................... 277/205, 206, 206.1, 277/214, 164, 197, 198, 236

[56] References Cited

U.S. PATENT DOCUMENTS

| | | |
|---|---|---|
| 641,263 | 1/1900 | Bonfiglio . |
| 3,007,600 | 11/1961 | Horner . |
| 3,313,553 | 4/1967 | Gastineau . |
| 3,346,266 | 10/1967 | Bondroit . |
| 3,519,278 | 7/1970 | Fuhrmann et al. . |
| 3,820,799 | 6/1974 | Abbes et al. . |
| 3,869,132 | 3/1975 | Taylor et al. . |
| 3,917,295 | 11/1975 | Abbes et al. . |
| 4,103,909 | 8/1978 | Hoffman et al. . |
| 4,114,907 | 9/1978 | Abbes et al. . |

Primary Examiner—Robert I. Smith
Attorney, Agent, or Firm—Roylance, Abrams, Berdo & Farley

[57] ABSTRACT

There is disclosed a resiliently deformable metallic annular sealing ring comprising an inner element and at least one adjacent concentric element. Each of the elements has a radial cross sectional shape comprising a curvilinear member which encompasses at least a portion of a circle, e.g., at least 210°, and which terminates in two end portions which are free to move relative to each other. The inner element is at least partially encased by the adjacent element. The mid-point between the two end portions of the cross sectional shape of the inner element is located opposite the midpoint between the two end portions of the cross sectional shape of the adjacent concentric element. In accordance with one embodiment of the invention, the cross sectional shape of the elements are C-shaped and there is a gap between the end portions of the cross sectional shape. In accordance with another embodiment of the invention, the cross sectional shape of the inner element appears as a flat spiral and the part of the curvilinear member joining one of the end portions overlaps a part of the curvilinear member joining the other end portion.

11 Claims, 7 Drawing Figures

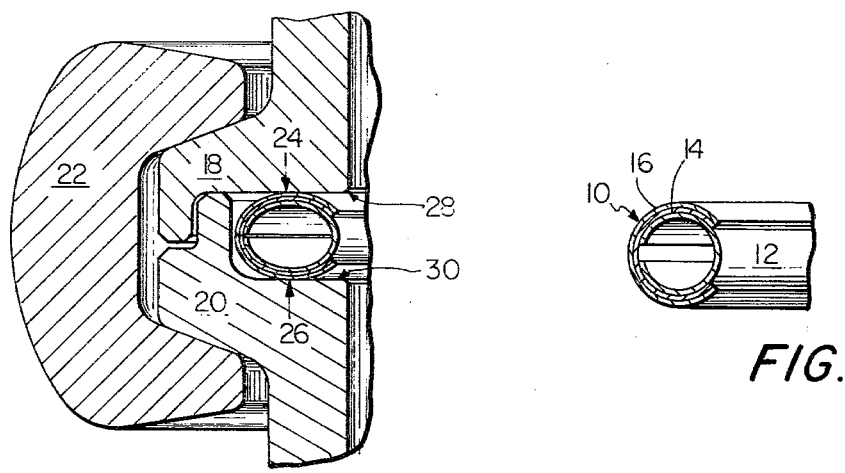
FIG. 2
FIG. 1
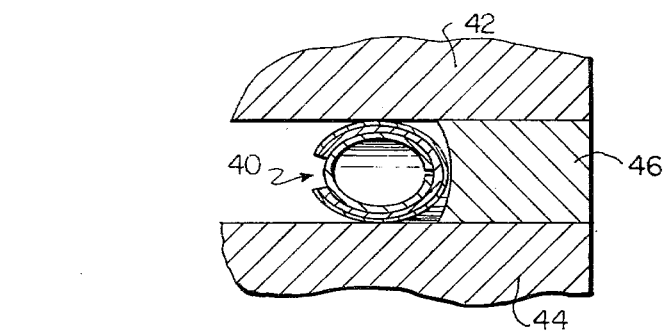
FIG. 3
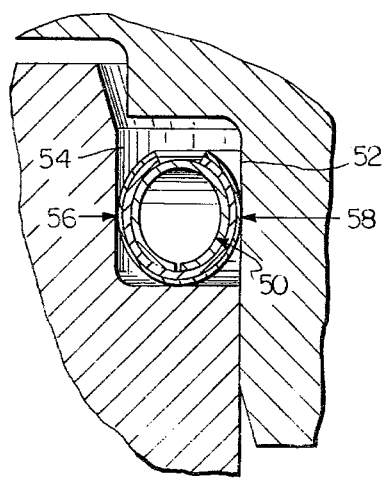
FIG. 4

MULTI-PLY SEALING RINGS

This invention relates to a resiliently deformable metallic sealing ring which combines a high sealing force with excellent spring back. More particularly, this invention relates to such a seal having the ability to provide a tight initial sealing and to continue sealing when separation of the mating sealing surfaces occurs.

Resilient metallic sealing rings are known which employ a central core formed by a helical coil or garter spring to increase the sealing load of a part-toroidal envelope. While such a ring provides a high sealing load and good spring back, it has at least two disadvantages which are:

1. The joint between the ends of the helical spring formed into a circle results in a load discontinuity and a high potential point of weakness. In the case of a helical spring that has one end reduced and inserted into the other, the load is higher at this point than at all other points along the sealing line. The spring back is also different resulting in a local discontinuity that can give rise to leakage, particularly when the flanges separate due to pressure and other loading conditions. In the case of a joint made by welding the ends of the coil spring together, the weld is a potential source of failure. The weld metal properties cannot be restored by heat treatment since the spring is usually wound in a special way to induce a pre-load which would be relieved during the heat treatment cycle.

2. The thin wire of the helical spring is particularly vulnerable to degradation by the effects of corrosion because of the relatively large surface area to volume ratio of the wire and the natural tendency for foreign materials to adhere to the surface of the wire in the narrow gap adjacent to the line of tangency of the coils. The opportunity for corrosion to occur is further enhanced at the weld, owing to the cast denderitic structure of the weld material in its untreated state. In many cases, however, corrosion is not a serious factor because the seal is used in a clean or inert environment such as a vacuum chamber or device.

It is an object of this invention to provide a metallic sealing ring capable of developing the high sealing forces required for "tight", i.e., $10^{-9}$ torr. liters per second of helium, sealing while exhibiting sufficient resilience to withstand large numbers of deflection cycles without failure through relaxation of spring properties or through metal fatigue. This is to be achieved without recourse to the use of garter springs.

This and other objects are attained by the practice of this invention which, briefly, comprises providing a resiliently deformable metallic annular sealing ring comprising an inner element and an adjacent concentric element. Each of the elements has a radial cross sectional shape comprising a curvilinear member which encompasses at least a portion of a circle, e.g., at least 210°, and which terminates in two end portions which are free to move relative to each other. The inner element is at least partially encased by the adjacent element. The mid-point between the two end portions of the cross sectional shape of the inner element is located opposite the mid-point between the two end portions of the cross sectional shape of the adjacent concentric element. In accordance with one embodiment of the invention, the cross sectional shape of the elements are C-shaped and there is a gap between the end portions of the cross sectional shape. In accordance with another embodiment of the invention, the cross sectional shape of the inner element appears as a flat spiral and the part of the curvilinear member joining one of the end portions overlaps a part of the curvilinear member joining the other end portion. The latter embodiment may advantageously be used where a slightly lower force, highly resilient sealing ring is desired.

In accordance with the practice of this invention, a helical coil or garter spring is not used, thus avoiding the disadvantages attendant with the use of such a spring. In this invention, the main source of the sealing load is an annular metal ring which, in accordance with one embodiment, in the initial state, i.e., before compression of the sealing ring at installation, has an incomplete, hollow toroidal shape, the generating circle of the cross section having a gap which closes, or partially closes, at installation. Formed over the outside of this inner toroidal ring is one or more toroidal layers also having a gap, the gap of the adjacent toroidal layer being positioned at 180° to or diametrically opposite the gap in the cross section of the inner ring. Successive layers may have the gaps aligned or diametrically opposite depending upon the magnitude of the sealing load desired.

The outer toroidal layer or jacket may be made of a hard metal coated with a softer material such as silver, gold, indium, aluminum or polytetrafluorethylene or may itself be made of such a soft material. The purpose of having the outer jacket made of or coated with a softer material is so that upon compression, the soft material will fill the surface asperities of the mating sealing faces. The inner ring and intermediate layers are usually made of a high strength, heat treatable ductile metal alloy, e.g., a precipitation hardenable nickel based alloy such as Inconel 718, Inconel X-750 or Waspaloy. When the outer jacket or ply of the sealing ring is to be coated with a soft material, it will also usually be made from one of the nickle based alloys but it may be in the "as formed" un-heat treated condition.

There are many advantages associated with the sealing rings of the invention. They have a high degree of reliability achieved by having all elements made of formed sheet and strip materials. Any required welding is performed prior to forming, thus insuring that the weld material is satisfactory. The metallic sealing rings of this invention can be manufactured to sufficiently close tolerances using economical die-forming and/or rolling methods.

In use, the sealing rings of this invention insure uniform distribution of sealing force (load) over the entire length of the sealing contact line. The rings are capable of accommodating thermal deformations of the mating sealing surfaces while maintaining sufficient sealing force to insure continuation of adequate sealing/leakage control performance. At high pressures, the sealing rings of this invention are energized by the pressure to assist in maintaining the sealing contact force when the mating surfaces tend to deflect away from the seal, owing to elastic strain in the assembled components induced by the system pressure and extraneous forces.

The metallic sealing rings of this invention have the ability to provide tight initial sealing and to continue sealing when separation of the mating sealing surfaces occurs. The rings are constructed so that the loading produced at installation is exceptionally uniform and so that the seals may be produced in a most economical manner. There are many uses for sealing rings constructed in accordance with this invention such as application in vacuum systems and devices, particle accelerators, nuclear reactors, high pressure equipment, petrochemical processing apparatus and internal combustion engine cylinder heads. The sealing rings of this invention are capable of controlling leakage to less than $10^{-9}$ torr. liters per second of helium (which is a most searching gas) operating at pressure differentials between $10^{-10}$ torr. and over 100,000 lbs. per sq. in. with the higher pressure on the inside or the outside of the sealing ring, and at temperatures from the cryogenic range to 1,400° F. and sealing against surface textures as rough as 63 micro-inches R.M.S. The seals of this invention are also reusable under most circumstances.

The invention will be more fully described by reference to the drawings wherein:

FIG. 1 is a partial radial sectional view showing the details of the sealing ring of this invention in the uncompressed state;

FIG. 2 is a partial sectional view showing the sealing ring of this invention installed between two flanges and showing the sealing ring following compression;

FIG. 3 is another partial sectional view showing a sealing ring of this invention installed between two flanges;

FIG. 4 is still another partial sectional view showing a sealing ring of this invention installed in a cavity;

Figure 5:
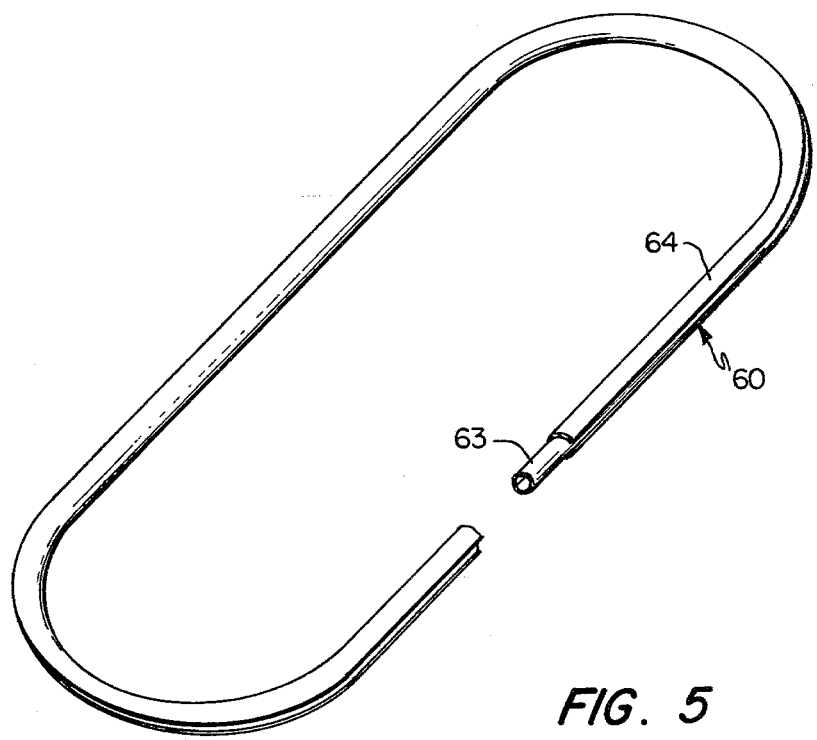
FIG. 5 is a perspective view, partially in section, of a sealing ring of this invention.

Referring to the drawings in detail and, more particularly, to FIG. 1, there is shown a sealing ring 10 comprising a ply 12 and an adjacent ply 14, both having C-shaped cross sections. Both the inner ply 12 and the adjacent ply 14 are formed of a resilient hard metal. The adjacent ply 14 encases the major portion of the inner ply 12. The gap in the C-shaped cross section of the outer ply is centered 180° or on the opposite side of the ring from the gap in the C-shaped cross section of the inner ply 12. A soft metal jacket or coating 16 covers the outside of the adjacent ply 14. Thus, the sealing ring 10 comprises two or more rings of C-shaped cross section nested together to form a multi-ply quasi-toroidal hollow ring, the second layer having its gap diametrically opposite the gap in the first layer. Where a third hard metal layer is added, the opening faces in the same direction as that of the inner ring. If a soft metal jacket or plated layer is added, it may be in the same direction as the second layer. If only two layers are used, the outer ply may be coated with the soft material.

The inner ply 12 of the seal will usually, but not necessarily, be made of a corrosion resistant, resilient precipitation hardening austenitic nickel-chromium alloy such as Inconel 718 or Inconel X-750 which will be heat-treated to achieve the desired load and spring back characteristics for the sealing ring. The adjacent ply 14 will usually be made from the same material as the inner ply 12, but perhaps of different thickness. It may or may not be heat treated, depending on the characteristics required. The jacket or coating 16 will usually be of a soft, ductile material such as aluminum, silver, gold, copper, lead or indium. In a typical, non-limitative, example, for a sealing ring with a 0.250 inch diameter free initial cross section, the inner ply 12 would, prefer-ably, have a thickness of 0.025 inches; the adjacent outer ply 14 would, preferably, have a thickness of 0.015 inches and would have a coating 16 of silver 0.0025-0.0035 inches thick. Alternatively, the coating could be replaced by an aluminum jacket 0.015 inches thick. The type of coating would be determined, largely, by the temperature and/or corrosive nature of the fluid to be sealed.

In use, the sealing ring 10 is confined between two surfaces spaced apart by an appropriate distance so that the ring is compressed sufficiently to insure satisfactory performance. A third surface in a plane normal to the first two, locates the sealing ring in the correct position against the sealing surfaces. As shown in FIG. 2, the sealing ring 10 is shown installed in a cavity formed by two flanges 18 and 20. The flanges are tightened together to provide the correct level of crushing force. The flanges depicted in FIG. 2 are V-flanges and the load for drawing them together is supplied by a V-coupling 22, although any other kind of body forming a cavity and any other means for supplying a clamping load, e.g., a bolted flange joint, could be substituted. Arrows 24 and 26 indicate the position of the sealing lines where compressive loading is transmitted between the sealing ring 20 and flange sealing surfaces 28 and 30. The loading must be sufficient to insure that the soft jacket or coating 16 will be deformed to fill the surface asperities in the sealing surfaces 28 and 30 of the seal cavity or housing.

It will be noted that the gap in the inner ply 12 as shown in FIG. 2 is substantially eliminated, i.e., the ends of the C-shaped cross section substantially abut at installation due to the seal having been compressed between the flanges 18 and 20. Thus, the gap in the inner ply after installation is almost completely closed, it being open only by the extent of spring back due to elastic restitution. The fact that the gap in the inner ply 12 is almost completely closed produces an increase in the stiffness of the sealing ring to generate the high loading necessary for effective sealing of the order of $10^{-9}$ torr. liters per second against comparatively rough, 63 micro-inches R.M.S. surfaces. The resilience of the seal is such that spring back can be around 0.010 to 0.020 inches, depending upon the size of the cross section.

The sealing rings of this invention are constructed so that the gap in the inner ply faces in the opposite direction from the source of pressure when sealing against high pressures, although this is not necessary when sealing against low or medium pressures. Thus, the sealing arrangement shown in FIG. 2 seals against high internal pressure and the gap in the inner ply 12 faces toward the outside away from the source of pressure. FIG. 3 shows an embodiment where it is intended to seal against external pressure. The sealing ring 40 is situated in a cavity formed by flange members 42 and 44 and retaining plate 46. The seal 40 is oriented with the direction of the plies oriented correctly for use in an application where the external pressure is higher than the internal pressure, as for example, in a vacuum chamber exterior wall. The substantially closed gap in the inner ply again faces away from the source of pressure. The use of retainer-spacer plate 46 avoids the necessity for costly groove machining and provides a mated assembly that can easily be adapted for installation by a mechanical manipulator as for example in radioactive or clean room environments.

Whereas FIGS. 1, 2 and 3 all show the sealing ring of this invention with the openings of the C-shaped members facing in the radial direction, FIG. 4 shows an axial seal. The seal 50 is located in a cavity formed between concentric cylindrical surfaces 52 and 54. Arows 56 and 58 indicate the position of the sealing lines where compressive loading is transmitted between the sealing ring 50 and the surfaces 52 and 54.

FIG. 5 shows a sealing ring 60 formed into a "race track shape". The sealing ring 60 comprises an inner ply 62 and an outer ply 64, both having C-shaped cross sections which face in opposite directions. This seal is formed by two parallel straight portions joined by semi-circular portions at their ends. The seal may be formed into many other shapes in addition to the circular ring shape which is employed in the majority of applications.

Figure 6:
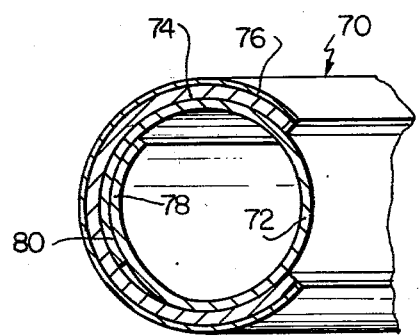
FIG. 6 is a partial radial sectional view of another embodiment of the sealing ring constructed in accordance with this invention.

FIG. 6 shows a sealing ring 70 formed of an inner ply 72 and an outer ply 74. The outer ply has a C-shaped cross section and is coated with a soft material 76. The inner ply has a cross sectional shape which forms a flat spiral—i.e., the end portions 78 and 80 overlap. The mid-point at which they overlap is opposite the gap in the C-shaped cross section of the outer ply 74.

Figure 7:
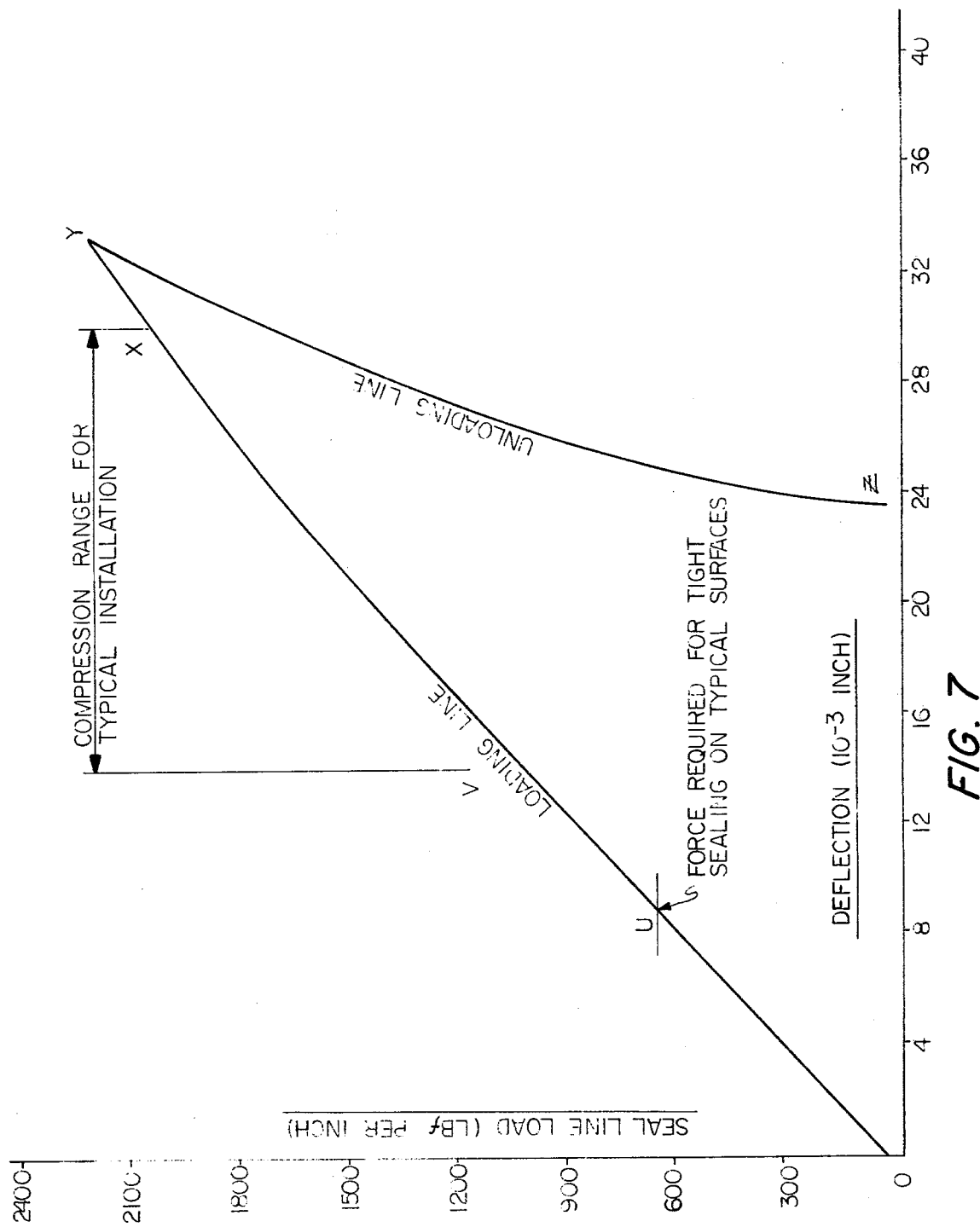
FIG. 7 is a force versus deflection graph showing a characteristic curve for compression of the sealing ring of this invention.

Referring now to FIG. 7, the graph depicted illustrates the force-deflection characteristics of a seal as shown in FIG. 2 having a height of 0.250 inch before compression. The cross section compression or deflections are plotted along the abscissa and the loadings generated by the sealing ring in response to these deflections are plotted on the ordinate axis. The intersections of the lines extended from these points form the loading and unloading line curves, OY and YZ. Point U on the loading line is the point at which satisfactory sealing can usually be achieved. Point V is the lower end of the compression range and Point X is its upper end. The extent of the compression range is dictated by the sum of the accumulated tolerances on the components housing the seal and the seal thickness. Point Y is the maximum compression point—i.e., compressing the seal beyond this point may result in excessive deformation which may adversely affect reusability and perhaps sealing performance. Point Z shows the amount of deflection remaining after removal of the seal from the compressive restraints of the housing or test fixture. This is known as the permanent deformation or set and must be subtracted from the maximum compressive deflection to obtain the spring back value.

What is claimed is:

1. A resiliently deformable metallic annular sealing ring comprising an inner element and an adjacent concentric element, each of said elements having a radial cross sectional shape comprising a curvilinear member which encompasses at least a portion of a circle and which terminates in two end portions which are free to move relative to each other, the inner element being at least partially encased by the adjacent concentric element, the midpoint between the two end portions of the cross sectional shape of the inner element being located opposite the midpoint between the two end portions of the cross sectional shape of the adjacent concentric element.

2. A sealing ring as defined in claim 1 wherein the cross sectional shape of at least one of said elements is C-shaped and there is a gap between said end portions.

3. A sealing ring as defined in claim 1 wherein the cross sectional shape of at least one of said elements appears as a flat spiral and the part of said curvilinear member joining one of said end portions overlaps a part of said curvilinear member joining the other of said end portions.

4. A sealing ring as defined in claim 1 having a planform outline of any geometric polygonal figure with curvilinear portions at the junctions of the straight lines which comprise the sides of the figure.

5. The combination of the sealing ring of claim 1 with a pair of relatively movable members which define between them a cavity in which high pressures are encountered and means for urging said members into engagement.

6. A resilient metallic annular sealing ring of multiply construction wherein each of the plies has a cross sectional shape approximating the letter C, the innermost ply having the gap in its generating circle facing in the opposite direction to its adjacent ply.

7. A sealing ring as defined in claim 6 comprising more than two plies, wherein each successive ply faces in the opposite direction to the one adjacent it.

8. A sealing ring as defined in claim 6 wherein the outermost ply is a jacket of soft material which faces in the same direction as the ply beneath it.

9. A sealing ring as defined in claim 6 comprising more than two plies, the innermost ply having the gap in its generating circle facing in one direction and all other plies having their openings facing in the opposite direction.

10. A sealing ring as defined in claim 6 having a planform outline of any geometric polygonal figure with curvilinear portions at the junctions of the straight lines which comprise the sides of the figure.

11. The combination of the sealing ring of claim 6 with a pair of relatively movable members which define between them a cavity in which high pressures are encountered and means for urging said members into engagement.

* * * * *